United States Patent [19]

Miyazaki et al.

[11] Patent Number: 5,426,631
[45] Date of Patent: Jun. 20, 1995

[54] INFORMATION RECORDING AND REPRODUCING APPARATUS FOR RECORDING AND REPRODUCING INFORMATION BY USING A PROBE ELECTRODE

[75] Inventors: Toshihiko Miyazaki, Hiratsuka; Masaru Nakayama, Atsugi; Ryo Kuroda, Machida; Toshimitsu Kawase, Ayase; Masahiro Tagawa, Isehara, all of Japan

[73] Assignee: Canon Kabushiki Kaisha, Tokyo, Japan

[21] Appl. No.: 167,140

[22] Filed: Dec. 16, 1993

[30] Foreign Application Priority Data

Dec. 21, 1992 [JP]  Japan ................................. 4-340754

[51] Int. Cl.⁶ .............................................. G11B 9/10
[52] U.S. Cl. ........................................ 369/126; 250/306
[58] Field of Search ............................. 250/306–307, 250/310, 311, 423 F, 442.11; 369/101, 126; 365/118, 114, 128, 151, 174, 217, 237

[56] References Cited

U.S. PATENT DOCUMENTS

| | | | |
|---|---|---|---|
| 4,575,822 | 3/1986 | Quate | 369/126 X |
| 4,831,614 | 5/1989 | Duerig et al. | 369/101 |
| 4,916,688 | 4/1990 | Foster et al. | 369/126 |
| 5,107,112 | 4/1992 | Yanagisawa et al. | 369/101 X |
| 5,187,367 | 2/1993 | Miyazaki et al. | 250/306 |
| 5,276,672 | 1/1994 | Miyazaki et al. | 369/126 |
| 5,299,184 | 3/1994 | Yamano et al. | 369/126 X |
| 5,321,685 | 6/1994 | Nose et al. | 369/126 |
| 5,323,375 | 6/1994 | Ihara et al. | 369/126 |
| 5,329,122 | 7/1994 | Sakai et al. | 369/126 X |

OTHER PUBLICATIONS

Kurt E. Petersen, "Silicon as a Mechanical Material", Proceedings of the IEEE, vol. 70, No. 5, pp. 420–457 (May 1982).

*Primary Examiner*—W. R. Young
*Attorney, Agent, or Firm*—Fitzpatrick, Cella, Harper & Scinto

[57] ABSTRACT

An information recording and reproducing apparatus is provided with a probe electrode supported by a probe plate and arranged to face a recording medium supported by a recording medium plate, drive elements for relatively moving the recording medium and the probe electrode, voltage application circuit for applying a voltage between the recording medium and the probe electrode and an electric wire take-out portion for taking out an electric wire provided on at least one of a plane of the probe plate opposite to the probe electrode and a plane of the recording medium plate opposite to the recording medium.

7 Claims, 7 Drawing Sheets

INFORMATION RECORDING AND REPRODUCING APPARATUS FOR RECORDING AND REPRODUCING INFORMATION BY USING A PROBE ELECTRODE

BACKGROUND OF THE INVENTION

1. Field of the Invention

The present invention relates to an information recording and reproducing apparatus for performing at least one of recording and reproducing of information, which uses a principle of a scanning tunneling microscope or a scanning interatomic force microscope.

2. Related Background Art

Recently, a scanning tunneling microscope (hereinafter referred to as STM) capable of directly observing an electron structure of a surface atom of a conductor, and an interatomic force microscope which applies the technology of the STM, have been developed and various applications thereof have been proposed. Particularly, applications for a recording apparatus which writes information into a recording medium at a high resolution and a reproducing apparatus for reading the information written in the recording medium at a high resolution have been developed. In an apparatus which applies the STM, it has been proposed to manufacture components thereof by a known technology called micromechanics or micromachining (see, for example, K. E. Petersen, Proc. IEEE, 70, 420 (1982)). An example is described below.

As shown in FIG. 1, a probe board 114 for supporting a plurality of probe electrodes 113 and a lead wire board 119 are provided on a probe base board 115, and the probe electrodes 113 and the lead wire board 119 are electrically connected with respect to the respective probe electrodes 113 by connecting wires 118 such as wire bonding. On the other hand, a recording medium 116 supported by a recording medium plate 117 is arranged to face the plane of the probe plate 114 on which the probe electrodes are provided. A pulsive voltage for writing a record bit on the recording medium 116 by a recording/reproducing voltage application circuit (not shown) is applied between the recording medium 116 and each of the probe electrodes 113, and a read voltage for reading the written information is applied to record and reproduce the information.

However, in the conventional recording and reproducing apparatus described above, the probe plate and the recording medium are in a very close position in the recording and reproducing modes. As a result, unless the electric lead wires from the probe plate are optimally designed, the connecting wires which are connecting parts with the lead wire plate interfere with the recording medium plate or the recording medium, so that there will arise a problem that the connecting wires are shorted each other or the connecting wires are broken. This problem is serious, particularly when the probe electrodes and the recording medium are relatively moved in a plane by a large distance.

SUMMARY OF THE INVENTION

It is an object of the present invention to provide an information recording and reproducing apparatus which optimize the wiring of the lead wires from the probe plate to prevent the interference with the recording medium and the recording medium plate when the recording medium and the probe electrodes are relatively moved.

The above object is achieved by an information recording and reproducing apparatus, which is provided with probe electrodes supported by a probe plate and arranged to face a recording medium supported by a recording medium plate, moving means for relatively moving the recording medium and the probe electrodes, voltage application means for applying a voltage between the recording medium and the probe electrodes, and electric wire take-out portion for taking out electric wires provided on at least one of a plane of the probe base plane opposite to the probe electrodes and a plane of the recording medium plate opposite to the recording medium.

In the information recording and reproducing apparatus of the present invention, since the electric wire lead means for taking out the electric wires is provided on at least one of the plane of the probe plate opposite to the probe electrodes and the plane of the recording medium plate opposite to the recording medium, the electric wires are taken out of the plane opposite to the plane to which the probe electrodes and the recording medium face. As a result, there is no projecting member other than the probe electrodes between the probe plate and the recording medium, and even if the probe electrodes and the recording medium are relatively moved in the plane, the electric wires do not interfere with the recording medium or the probe electrodes.

DETAILED DESCRIPTION OF THE PREFERRED EMBODIMENTS

An embodiment of the present invention is now explained with reference to the drawings.

Figure 1:
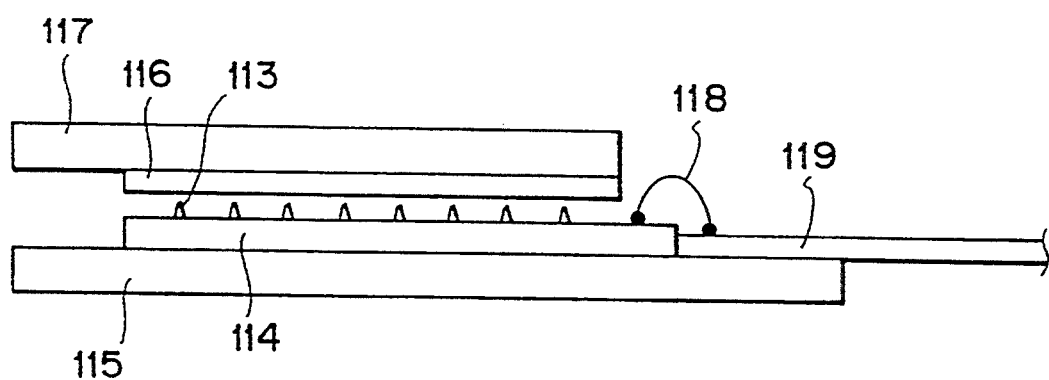
FIG. 1 shows a sectional view of a neighborhood of a probe plate and a recording medium for illustrating a positional relationship between the probe plate and the recording medium in a conventional information recording and reproducing apparatus.
Figure 2:
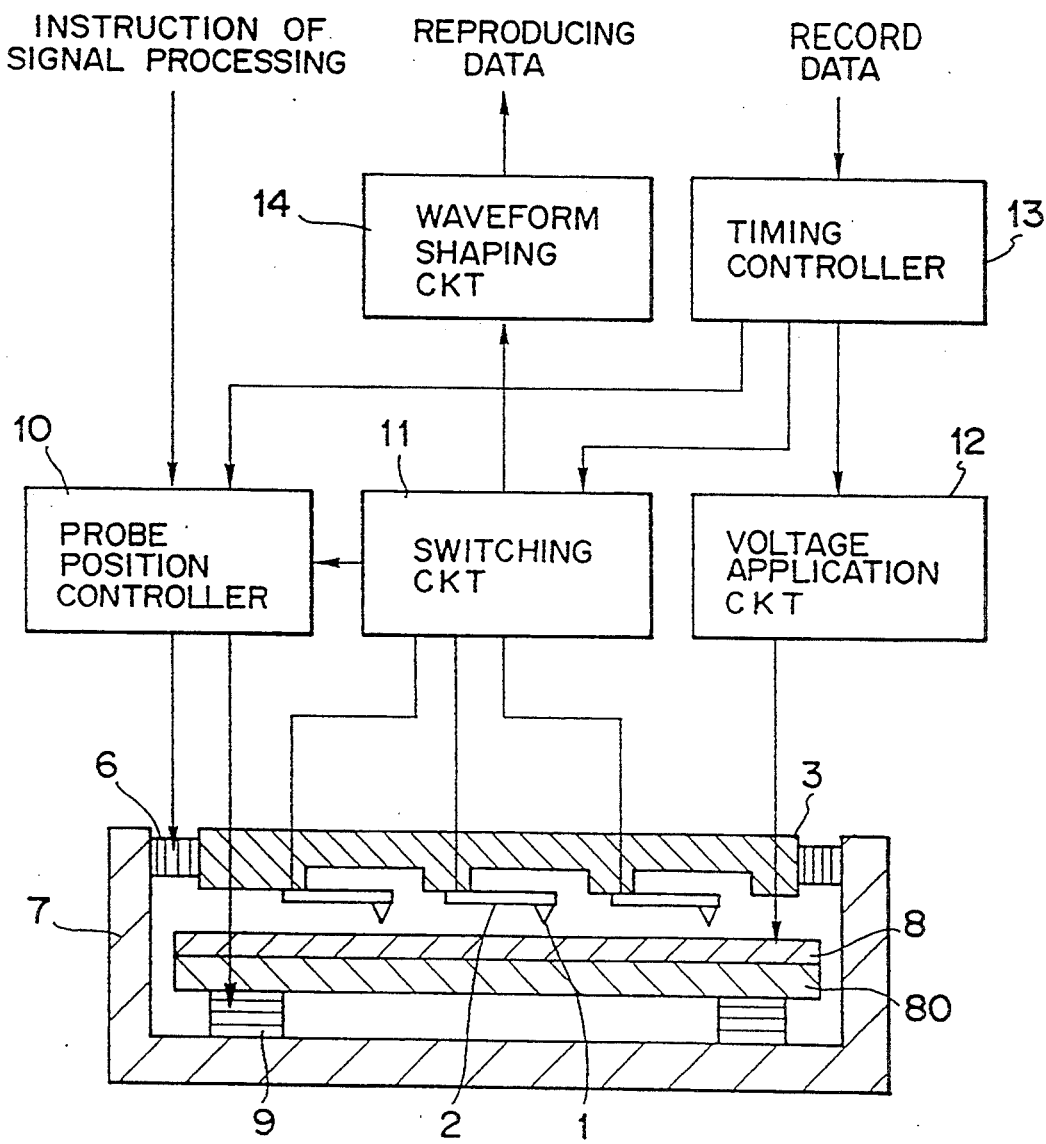
FIG. 2 shows a block diagram of one embodiment of the information recording and reproducing apparatus of the present invention.

FIG. 2 shows a block diagram of one embodiment of the information recording and reproducing apparatus of the present invention. As shown in FIG. 2, conductive probe electrodes 1 are fixed to free ends of cantilevers 2 made of elastic material. The fixed ends of the cantilevers 2 are fixed to a probe plate 3 made of a silicon single crystal substrate. An xy drive element 6 including a piezo-electric element has one end thereof fixed to the probe plate 3 and the other end thereof fixed to an inside of a main body 7, so that the probe electrodes 1 can be driven in xy directions by the xy drive element 6. Accordingly, the probe electrodes 1 can be moved to any position in the xy direction.

On the other hand, a recording medium 8 includes a record layer having a Squarilium-Bis-6-n-Octylazulene (SOAZ) dye organic thin film deposited on a gold electrode, and the gold electrode of the recording medium 8 is formed on a medium plate 80. A z drive element 9 including a piezo-electric element has one end thereof fixed to the medium substrate 80 and the other end fixed to the inside of the main body 7, so that the medium plate 80 is driven in the z direction by the z drive element 9 and the recording medium 8 is moved in the z direction. As seen from the above description, the drive means for relatively moving the probe electrodes 1 and the recording medium 8 is constituted by the xy drive element 6 and the z drive element 9.

A probe position controller 10 controls the z position of the probe electrodes 1 (a spacing between the probe electrode 1 and the recording medium 8) and the xy position of the probe electrodes 1 by instruction of signal processing, or signal from timing controller 13 or switching circuit 11, and it is connected to the xy drive element 6 and the z drive element 9. The switching circuit 11 switches signals to the probe electrodes 1 by a signal from the timing controller 13, and switches the signal from the probe electrodes 1 and transmits it to a waveform shaping circuit 14. A recording/reproducing voltage application circuit 12 which serves as voltage application means applies a pulsive voltage to write a record bit to the recording medium 8 by a signal from the timing controller 13, and applies a read voltage to read the written information. The timing controller 13 is connected to the probe position controller 10, the switching circuit 11 and the recording/reproducing voltage application circuit 12 to control the time division processing of the recorded and reproduced data and the allocation of the record signals to the probe electrodes. The waveform shaping circuit 14 which serves as current detection means detects a current flowing between the recording medium 8 and the probe electrodes 1 to reproduce the information recorded by the signal from the probe electrodes 1.

Figure 3:
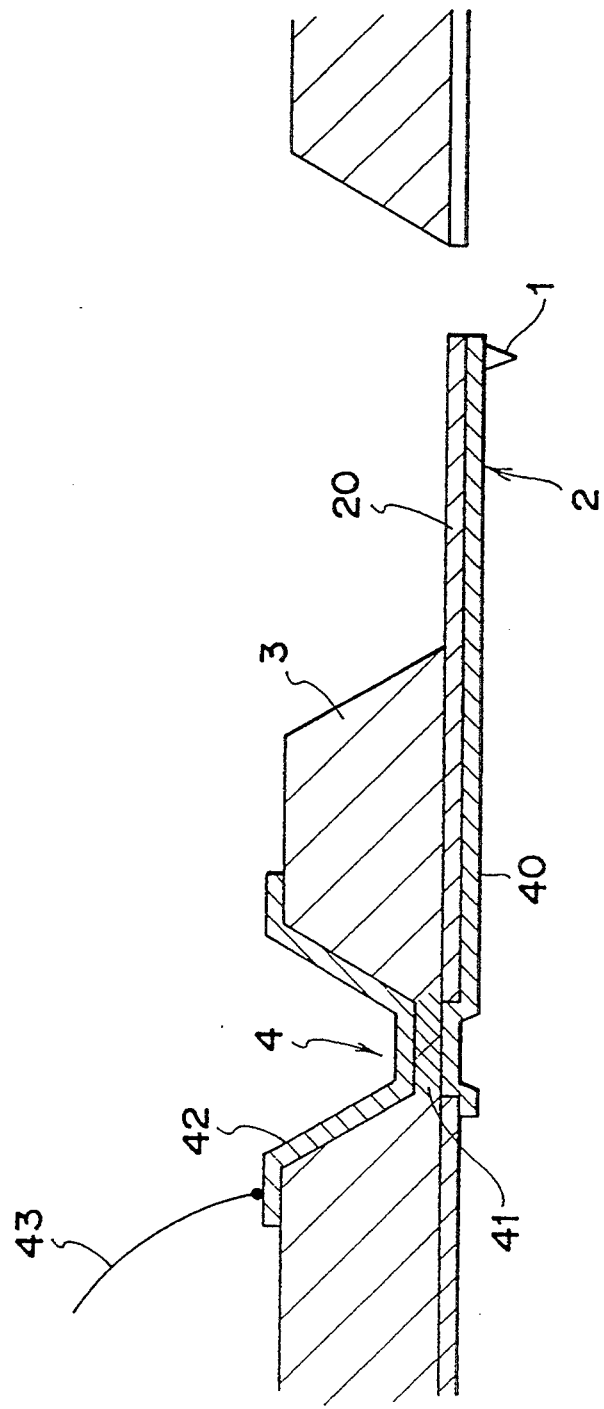
FIG. 3 shows a sectional view of a neighborhood of a cantilever of the probe plate shown in FIG. 1.

A structure of the probe plate 3 is explained in detail with reference to FIG. 3. FIG. 3 shows a sectional view of a neighborhood of a cantilever of the probe plate shown in FIG. 2. As shown in FIG. 3, the cantilever 2 to which the probe electrode 1 is fixed is made by depositing a resilient oxide film 20 and an electrical signal wire 40. The probe electrode 1 is electrically connected to the electrical signal wire 40. The fixed end of the cantilever 2 is fixed to one plane of the probe plate 3 made of a silicon single crystal plate, and an electrical wire lead portion 4 is formed on the other plane of the probe plate 3. The electric wire lead portion 4 includes a conductive member 41, a conductive film 42 having a metal vapor-deposited thereon, and a leading wire 43 by wire bonding which serves as an electrical wire for taking an electrical signal out of the probe plate 3. An electrical signal from the probe electrode 1 flows to the electrical signal wire 40, the conductive member 41, the conductive film 42 and the lead wire 43 sequentially, whereby the electrical signal is taken out to the plane of the probe plate 3 opposite to the probe electrode 1.

The electric wire lead 4 of the present embodiment is formed in the following manner. Ions are implanted to that portion of the silicon single crystal substrate (probe plate 3) having both sides thereof polished which is to be formed into the conductive member 41. Then, an area from a rear side (an upper plane in FIG. 3) of the silicon single crystal to the ion implanted portion which is to be formed into the conductive member 41 is electrolytically etched by potassium hydroxide (KOH) solution. Thus, the conductive member 41 is formed at the bottom of the hole formed by the etching. Then, chromium (Cr) is evaporated on to the hole through a mask, and gold (Au) is applied to form the conductive film 42. A bonding pad for the wire bonding is provided on the conductive film 42 as connecting means.

The probe electrodes 1 and the cantilevers 2 are formed in the following manner. A thermal oxidization film is formed on a silicon single crystal substrate to a thickness of 0.3 μm, and as many oxide films 20 as the number of cantilevers 2 to be formed, which are of lever shape having a length of 100 μm and a width of 20 μm, are patterned. A pattern of the electrical signal wire 40 is then formed on the oxide film 20 and a predetermined portion of the silicon single crystal substrate is etched by potassium hydroxide (KOH) solution from the upper surface to form the cantilevers 2. Then, carbon (C) is deposited to a height of 5 μm at the ends of the cantilevers 2 by an electron beam deposition method to form the probe electrodes 1.

Figure 4:
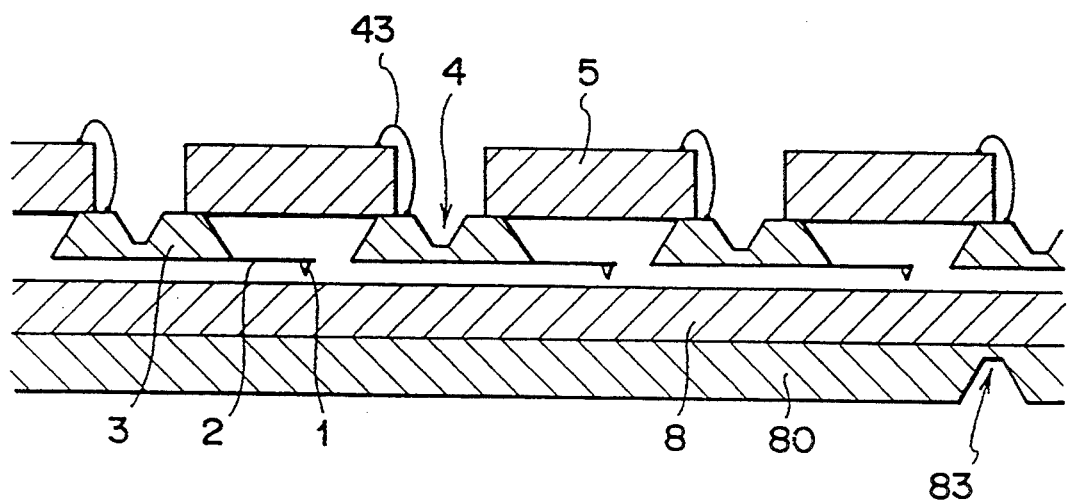
FIG. 4 shows a sectional view of a neighborhood of the probe plate and the recording medium for illustrating a positional relation between the probe plate and the recording medium shown in FIG. 1.
Figure 5:
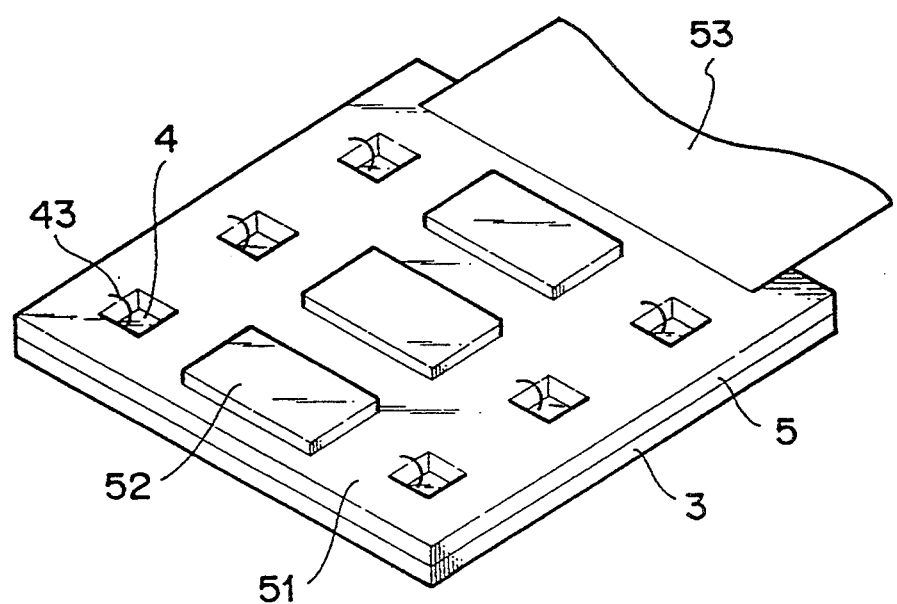
FIG. 5 shows a perspective view of a probe plate and an electric circuit board shown in FIG. 4.

A positional relationship between the probe plate 3 and the recording medium 8 (see FIG. 2) is now explained with reference to FIGS. 4 and 5. FIG. 4 shows a sectional view of a neighborhood of the probe plate and the recording medium for illustrating the positional relationship between the probe plate and the recording medium shown in FIG. 2, and FIG. 5 shows a perspective view of the probe substrate and the electric circuit board shown in FIG. 4. As shown in FIGS. 4 and 5, an electric circuit board 5 (which includes the circuits 10–14 of FIG. 2) for effecting the control is attached to the plane of the probe plate 3 opposite to the probe electrode 1, and the lead wires 43 are connected to the signal wires through a bonding pad (not shown) formed in the electric wiring area 51 of the electric circuit board 5 from the electric wire lead 4 formed on the probe plate 3. Electric parts 52 for processing the signals from the probe electrodes 1 are mounted on the electric circuit board 5 and they are connected to the control unit through an external connection unit 53 having a flexible printed circuit board. The recording medium 8 is arranged to face the probe electrodes 1.

In the present construction, only the probe electrodes 1 project to the plane of the probe plate 3 facing the recording medium 8. Thus, when the probe plate 3 and the recording medium 8 are relatively moved in a plane, the lead wires 43 do not interfere with the recording medium 8. As a result, the degree of freedom in arranging the probe substrate 3 and the recording medium 8 is increased. Further, since the electric signal wires from the probe electrodes 1 are connected to the electric circuit in short paths without routing the probe plate 3, the circuit is resistable to disturbance.

Figure 6:
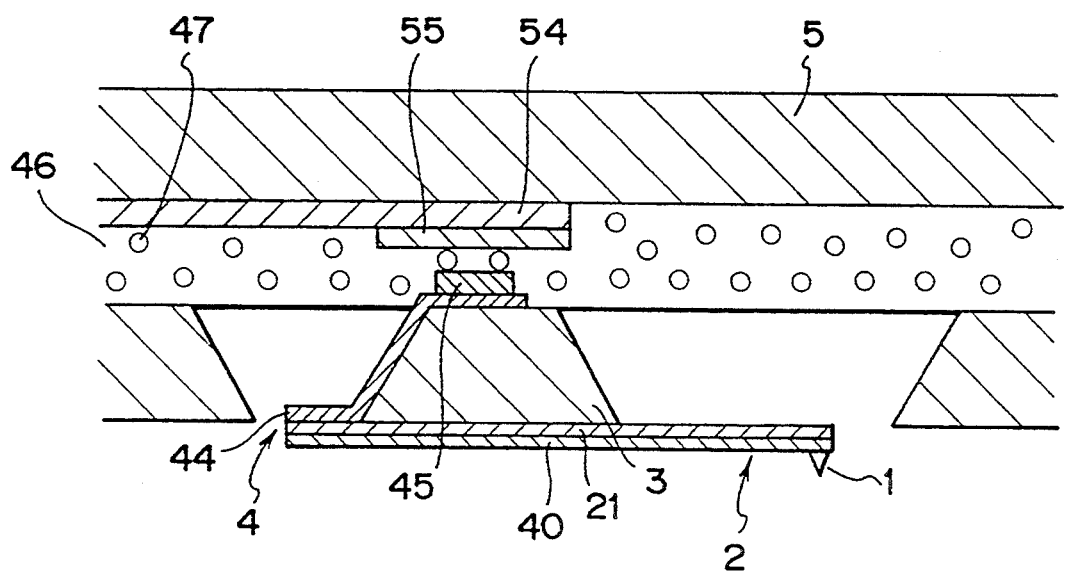
FIG. 6 shows a sectional view of a neighborhood of a cantilever of a probe plate in another embodiment of the information recording and reproducing apparatus of the present invention.

FIG. 6 shows a sectional view of a neighborhood of the cantilevers of the probe plate in another embodiment of the information recording and reproducing apparatus of the present invention. In the present embodiment, the conductive probe electrodes 1 are fixed to free ends of the cantilevers 2 having a resilient and conductive film 21 and electrical signal wires 40 and they are electrically connected to the conductive film 21 and the electrical signal wires 40. The fixed ends of the cantilevers 2 are fixed to the probe plate 3 made of a silicon single crystal substrate. The electrical wire lead 4 includes electrical signal wires 40, conductive film 21, conductive wires 44 having metal evaporated thereon, and a metal bump 45 formed to take the electrical signals out of the probe plate 3. The electrical signal from the probe electrode 1 sequentially flows to the conductive film 21, the electrical signal wires 40, the conductive wires 44 and the bump 45, so that the electrical signal is taken out of the plane of the probe plate 3 opposite to the probe electrodes 1. The probe plate 3 and the electric circuit board 5 are electrically connected by using conductive particles 47 contained in an anisotoropy conductive sheet 46 between the bump 45 facing the probe plate 3 and the electrode pad 55 facing the electric circuit board 5. The recording medium (not shown) is arranged to face the probe electrodes 1.

The probe plate 3 of the present embodiment is formed in the following manner. Ions are implanted to a silicon single crystal substrate having both sides thereof polished to form a conductive member, and a plurality of lever shaped conductive films 21 having a length of 150 μm and a width of 30 μm are patterned (only one lever is shown in FIG. 6). Then, a pattern of the electrical signal wires 40 is formed and electrolytic etching is conducted by potassium hydroxide (KOH) solution to the ion implanted area from a rear side (upper surface in FIG. 6) of the silicon single crystal substrate. Thus, the cantilevers 2 and the levers with short electrical wire leads are formed. Chromium (Cr) is evaporated to the short levers through a mask, and gold (Au) is applied to form the conductive wires 44. The bumps 45 for the anisotoropy conductive sheet 46 are provided on the conductive wires 44. Then, carbon (C) is deposited to a height of 5 μm at the ends of the cantilevers 2 by an electron beam deposition method to form the probe electrodes 1. In this manner, the probe electrodes 1 are formed at the ends of the cantilevers 2 on the probe plate 3.

The probe plate 3 and the electric circuit board 5 are connected in the following manner. The anisotoropy conductive sheet 46 having a number of conductive particles 47 uniformly dispersed in the bond is positioned between the probe plate 3 and the electric circuit board 5, and it is heated and pressurized so that the conductive particles 47 are physically contacted only vertically (between the bump 45 and the electrode pad 55) to make it conductive.

In the present embodiment, like in the embodiment shown in FIG. 3, only the probe electrodes 1 project to the plane of the probe plate 3 opposite to the recording medium (not shown). Accordingly, when the probe plate 3 and the recording medium are relatively moved in the plane, the conductive wires 44 do not interfere with the recording medium. Further, since the electrical signal wires 40 from the probe electrodes 1 can be connected to the electric circuit board 5 in a short path without routing to the probe plate 3, the circuit is resistable to disturbance.

In the embodiments described above, the electrical wires are taken out from the neighborhood of the probe electrodes 1 to the opposite side of the probe substrate 3 although the present provided on the probe plate 3 and the electric wires may be taken out of the end of the probe plate 3. The position to taken out to the opposite side of the probe plate 3 is not limited to that described in the embodiments. Further, while the probe plate 3 is described in connection with the take-out of the electric wires, it may be applied to the medium plate 80 (FIG. 4).

Figure 7:
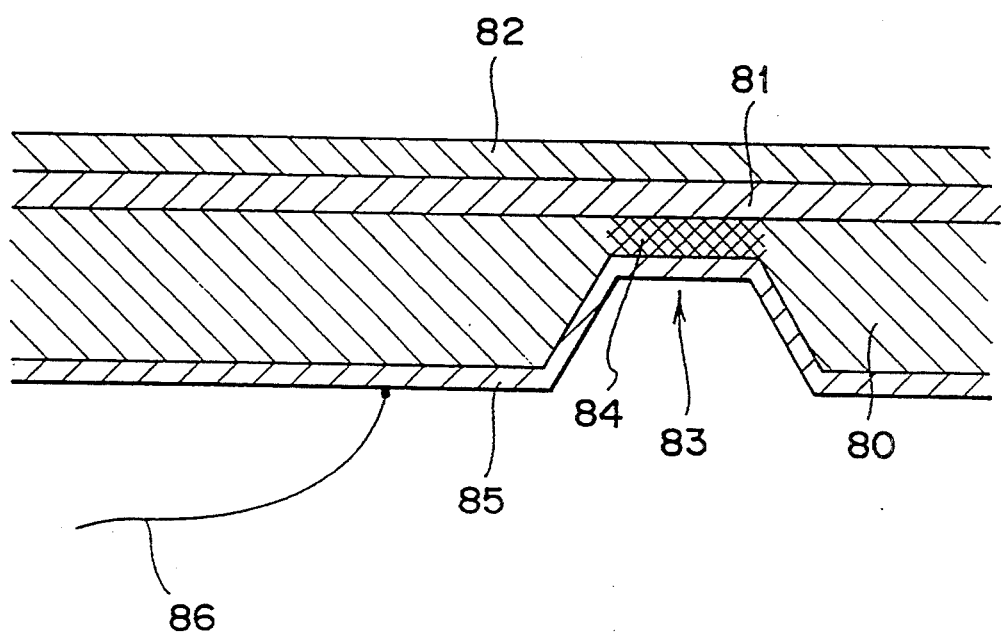
FIG. 7 shows a sectional view of the recording medium shown in FIG. 4.

This is explained in detail with reference to FIG. 7. Numeral 80 denotes a recording medium plate made of a silicon single crystal substrate, numeral 81 denotes a recording medium underlying electrode having gold (Au) epitaxially grown, numeral 82 denotes a record layer having a Squarilium-Bis-6-n-Octylazulene (SOAZ) dye organic thin film deposited on the recording medium underlying substrate by an LB method, numeral 83 denotes an electric wire take-out portion formed on the plane of the recording medium plate opposite to the record layer, numeral 84 denotes a conductive member, numeral 85 denotes a conductive film having gold evaporated, and numeral 86 denotes an electrical wire for taking the electrical signal out of the recording medium plate 80. Thus, the information signal from the record layer 82 flows to the recording medium underlying electrode 81, the conductive member 84, the conductive film 85 and the lead wire 86 sequentially, so that the information signal may be taken out from the plane of the recording medium substrate 80 opposite to the record layer.

The electric wire lead 83 in the present embodiment is formed in the same manner as that of the electric wire lead 4 of FIG. 3. It is also effective where the underlying electrode of the recording medium 8 is divided into a plurality of portions. The electrical connection between the probe plate 3 and the electrical circuit board 5 may be made by soldering but preferably it is made by solderless mounting method such as conductive bond connection, conductive plated resin ball connection or direct connection by gold bump and insulative resin.

The present invention offers the following advantages.

Since the electric wire lead for taking out the electric wire is provided on at least one of the plane of the probe plate opposite to the probe electrodes and the plane of the recording medium plate opposite to the recording medium, there is no projecting member other than the probe electrodes between the probe plate and the recording medium. Thus, when the probe electrodes and the recording medium are relatively moved in the plane, the electric wires do not interfere with the recording medium or the probe electrodes. As a result, the recording and reproducing apparatus having a high degree of freedom in arranging the probe plate and the recording medium substrate is attained.

Further, since it is not necessary to route the electric wires on the plate, the length of the electric wires can be shortened and the signal from the probe electrodes is resistive to the external disturbance and the design of the probe plate having a plurality of probe electrodes is facilitated.

What is claimed is:

1. An information recording and reproducing apparatus for performing at least one of recording and reproducing of information by using a probe electrode comprising:

the probe electrode supported by a probe plate and arranged to face a recording medium supported by a recording medium plate;

moving means for relatively moving said recording medium and said probe electrode;

voltage application means for applying a voltage between said recording medium and said probe electrode; and an electric wire take-out portion for taking out an electric wire provided on at least one of a plane of said probe plate opposite to said probe electrode and a plane of said recording medium plate opposite to said recording medium.

2. An apparatus according to claim 1, wherein said probe plate is a single crystal substrate.

3. An apparatus according to claim 2, wherein said single crystal substrate is a silicon single crystal substrate.

4. An apparatus according to claim 1, wherein said recording medium plate is a single crystal substrate.

5. An apparatus according to claim 4, wherein said single crystal substrate is a silicon single crystal substrate.

6. An apparatus according to claim 1, wherein said probe plate is separate from an electrical circuit board for conducting control, and includes connection means for electrically connecting said probe plate and said electrical circuit board through said electric wire take-out portion.

7. An information recording and reproducing apparatus according to claim 6, wherein said connection means is formed by a solderless mounting method.

* * * * *